United States Patent [19]

Baden et al.

[11] Patent Number: 4,878,563
[45] Date of Patent: Nov. 7, 1989

[54] BRAKE APPARATUS

[75] Inventors: Bradley J. Baden; John H. Warren, both of Troy, Ohio

[73] Assignee: The B.F. Goodrich Company, Akron, Ohio

[21] Appl. No.: 848,190

[22] Filed: Apr. 4, 1986

Related U.S. Application Data

[63] Continuation-in-part of Ser. No. 630,622, Jul. 13, 1984, abandoned.

[51] Int. Cl.⁴ .............................................. F16D 55/36
[52] U.S. Cl. .............................. 188/71.5; 188/251 A; 192/70.16; 192/107 M
[58] Field of Search .................... 188/71.1, 71.5, 73.2, 188/251 A, 218 XL, 250 G; 192/70.14, 70.16, 70.19, 70.2, 107 M

[56] References Cited

U.S. PATENT DOCUMENTS

| | | | |
|---|---|---|---|
| 2,902,130 | 9/1959 | Halberg et al. | 188/218 XL |
| 2,916,105 | 12/1959 | Dasse et al. | 188/71.5 |
| 3,094,193 | 6/1963 | Dowell | 188/71.5 |
| 3,447,641 | 6/1969 | Dowell | 188/250 G X |
| 4,117,912 | 10/1978 | Ruppe, Jr. | 188/71.5 X |
| 4,214,651 | 7/1980 | Cunningham | 188/73.2 X |

FOREIGN PATENT DOCUMENTS

| | | | |
|---|---|---|---|
| 67113 | 12/1982 | European Pat. Off. | 188/71.5 |
| 1141309 | 12/1962 | Fed. Rep. of Germany | 188/218 XL |
| 199680 | 9/1967 | U.S.S.R. | 188/71.5 |

Primary Examiner—George E. A. Halvosa
Attorney, Agent, or Firm—Joseph Januszkiewicz

[57] ABSTRACT

A multiple disc brake assembly having a plurality of interleaved rotor discs and stator discs which are cooperative with a stationary torque tube which has a carbon composite brake pad mounted on its reaction plate in such a manner to prohibit stress concentration due to relative thermal expansion between the non-similar materials of the torque tube and brake pad at the torque reaction points while providing a reaction mechanism to circumferential forces generated by brake friction.

11 Claims, 3 Drawing Sheets

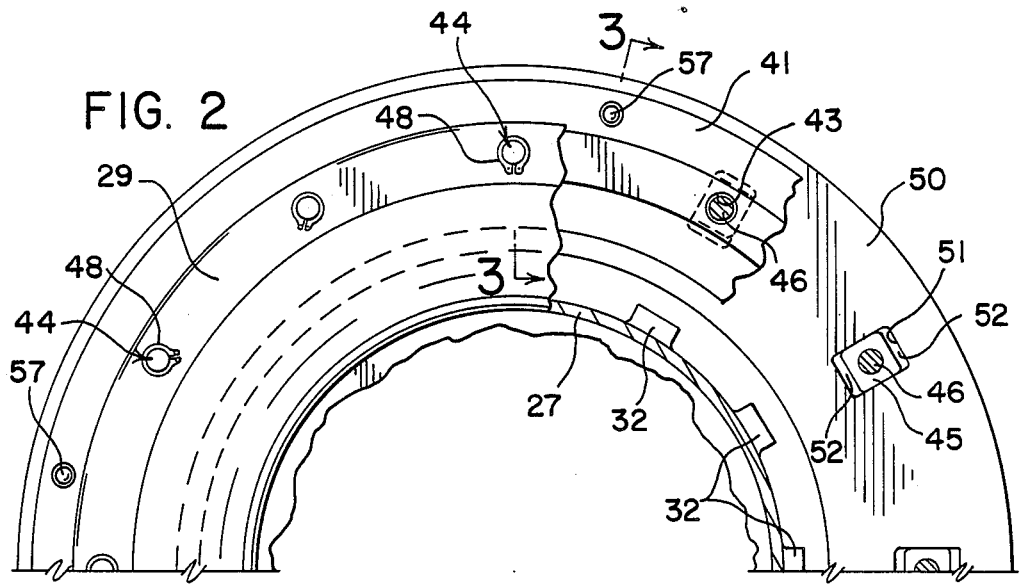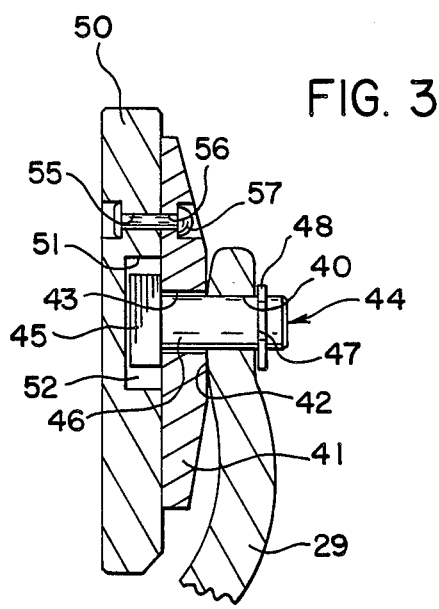

BRAKE APPARATUS

This application is a continuation-in-part application of application Ser. No. 06/630,622 filed July 13, 1984, now abandoned.

BACKGROUND OF THE INVENTION

This invention relates to aircraft wheel assemblies and more particularly to aircraft wheel assemblies employing interleaved rotors and stators.

The rotating brake discs, referred to as rotors, are coupled to the rotating wheel of the aircraft while the nonrotating brake discs, referred to as stators, are coupled to the nonrotating axle support. Frictional interaction of the stators and rotors provides a braking action which is resisted by the supporting structure between the stators and the fixed axle which is commonly referred to as a torque tube. For maximum efficiency it is desirable to use as many stators and rotors as practical in the space available to insure maximum braking efficiency. The present invention improves on the existing brake assembly by utilizing more effectively the torque tube's back plate and its support of the braking disc. Carbon brake stator discs are normally keyed on their inner periphery to the splines of the torque tube for torque load reaction. This invention provides for a reliable torque reaction point on the non-wearing side of the carbon end stator adjacent to the torque tube back plate at the mean brake radius. Moving the torque reaction point away from the inner disc periphery allows the use of a generous radius in the juncture between the torque tube and its back plate. This feature reduces weight, simplifies machining, and allows better utilization of the brake well volume.

SUMMARY OF THE INVENTION

The present invention is directed to a multiple disc brake assembly having a plurality of interleaved rotor and stator discs employed in cooperation with a stationary torque tube having a backing plate carrying a carbon composite brake pad. The brake pad is connected to the backing plate in a manner to prohibit thermal expansion induced stresses at the torque reaction points while providing rigid support for the reaction between the stator and rotor discs.

BRIEF DESCRIPTION OF THE DRAWINGS

FIG. 2 is a fragmentary side elevational view of one-half of the back side of a torque tube taken on line 2—2 of FIG. 1 with portions broken away to show the carbon lining and the backing plate;

FIG. 3 is an enlarged cross-sectional view of the back side of a torque tube taken on line 3—3 of FIG. 2;

DETAILED DESCRIPTION

Figure 1:
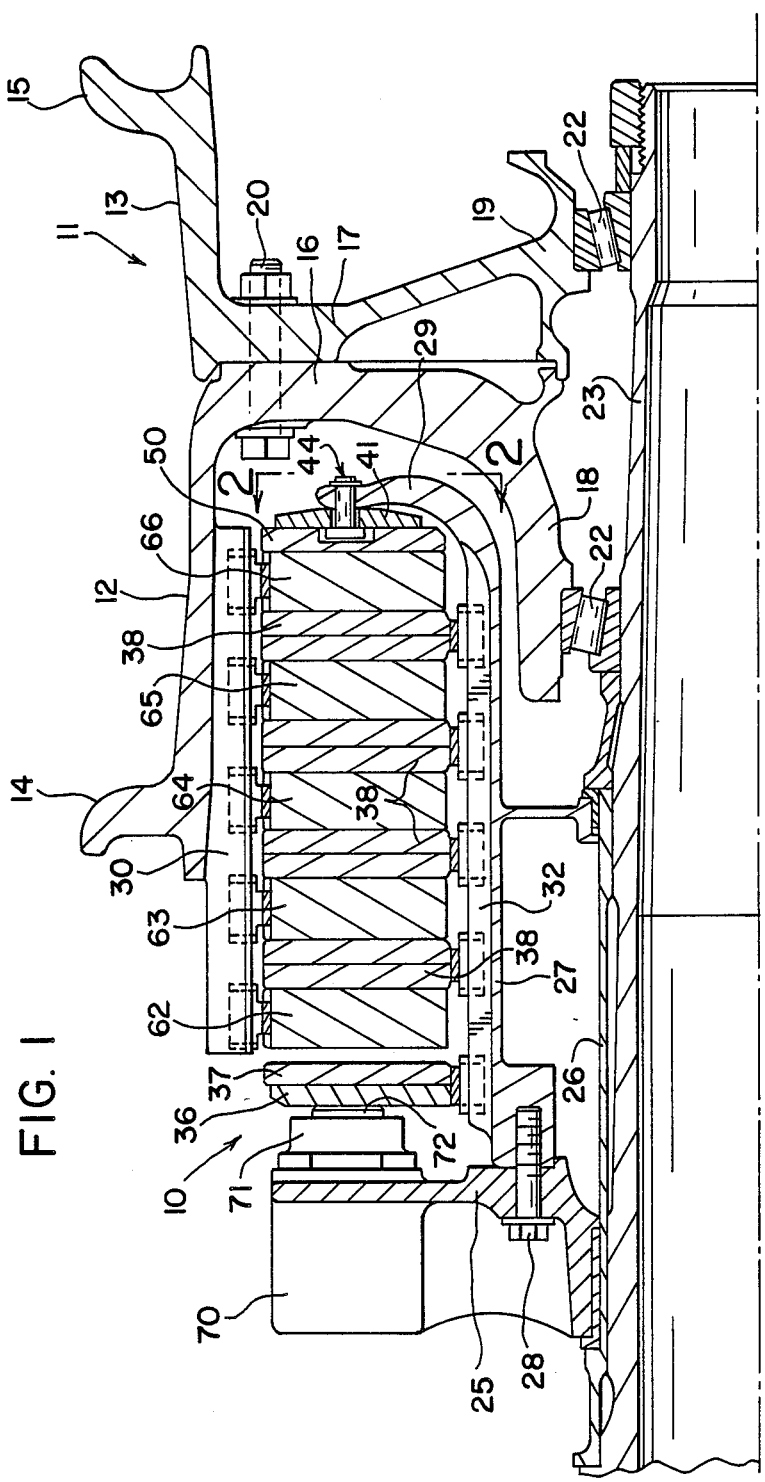
FIG. 1 is a fragmentary cross-sectional view of a brake assembly embodying the invention as shown mounted on an aircraft wheel installation in phantom lines.

Referring to the drawings, wherein like reference numerals designate like or corresponding parts throughout the several views, there is shown in FIG. 1 a friction brake mechanism 10 mounted on a cylindrical wheel 11 having matching wheel sections 12 and 13. Each of the wheel sections 12 and 13 has a rim member 14 and 15, web member 16 and 17, and hub members 18 and 19, respectively. The wheel sections 12 and 13 are fastened together by suitable bolts 20 disposed in aligned bores within web members 16 and 17.

The hub members 18 and 19 are supported for rotation on bearings 22 mounted on a nonrotatable axle member 23. In the example shown, a torque flange 25 is suitably connected to the axle member 23. An elongated annular shaped torque tube 27 is suitably secured to the torque flange 25 and extends axially along the axle 23. The torque tube 27 is located between the wheel section 12 and the hub member 18. The torque flange 25, auxiliary sleeve 26 and torque tube 27 are suitably fastened together such as by bolts 28 at circumferentially spaced positions around the flange 25.

The back leg or the one end of torque tube 27, opposite to the end abuttingly contacting torque flange 25, has an annular and radially outwardly extending reaction plate or member 29. Plate 29 may be made integral with the torque tube 27 or may be made as a separate piece and suitably connected to the torque tube 27.

Figure 4:
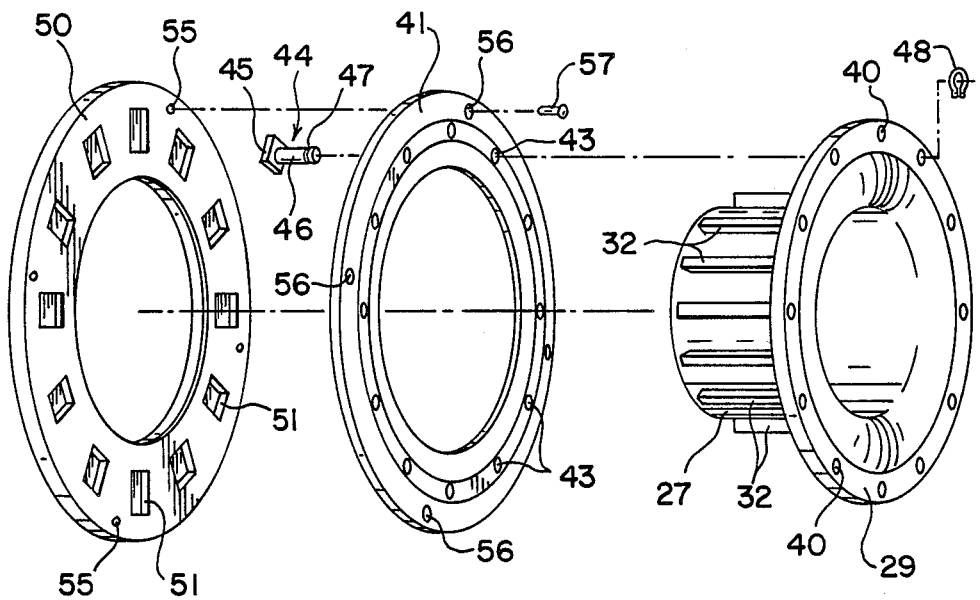
FIG. 4 is an exploded perspective view of a portion of the torque tube, backing plate, and annular carbon lining.

The reaction plate 29 has a plurality of circumferentially spaced bores 40. An annular backing plate 41 is in abutting contact with an annular face 42 of reaction plate 29. Backing plate 41 has a plurality of circumferentially spaced bores 43 in axial alignment with the bores 40 of reaction plate 29 of torque tube 27 such that bolts 44 located in the aligned bores interconnect the backing plate 41 to the reaction plate 29 and the torque tube 27. Each bolt 44 has a rectangular shaped head 45, a round longitudinal shank 46, and a groove 47 adjacent to the end portion of shank 46. The head 45 of bolt 44 holds the backing plate 41 in abutting contact with the reaction plate 29 with the groove 47 on shank 46 projecting beyond the surface of the reaction plate 29 such that a U-shaped clip 48 frictionally engages the groove 47 on shank 46 and thereby retains the backing plate 41 on the plate 29 of torque tube 27. An annular carbon composite disc 50 has a plurality of circumferentially spaced rectangular shaped recesses 51 in alignment with the square shaped head 45 of bolt 44 such that as the disc 50 is placed into abutting contact with the backing plate 41, the recess 51 receives the head 45. Rectangular shaped recess 51 has a clearance space 52 above and below the head 45, while the respective sides of the recess 51 snugly receive the head 45 of the bolt 44. As seen in FIGS. 2 and 4, carbon composite disc 50 has its slot on radial lines from the center of such disc. The thermal expansion of the carbon composite disc 50 is different from the steel backing plate 41 and the steel bolt 44. The clearance space 52 in recess 51 prevents any load reaction resultant from the thermal expansion of bolt head 45 and the annular backing plate 41 relative to the carbon composite disc 50 and thus will not introduce additional stress concentration along the surfaces in the recesses 51 in the carbon composite disc 50 where such bolt head 45 contacts such surface.

Carbon disc 50 has a plurality of circumferentially spaced bores 55 in axial alignment with a plurality of circumferentially spaced bores 56 when disc 50 is placed into abutting contact with backing plate 41, and the recesses 51 are aligned with circumferentially spaced bores 43 in plate 41. The carbon composite disc 50 is fastened to the backing plate 41 by suitably upsetting rivets 57 positioned within aligned bores 55 and 56.

Torque tube 27 has a plurality of circumferentially spaced splines 32 which are axially extending. The upper end portion of web member 16 of wheel section 12 has a plurality of circumferentially spaced splines or ribs 30 (only one shown in FIG. 1) which may be forged and then machined to provide an integral type rib or spline.

Spline members 32 support a nonrotatable end disc 36 with a carbon composite braking pad 37 secured thereto and a plurality of inner discs 38. All of such nonrotatable discs 36 (with carbon pad 37) and 38 have slotted openings at circumferentially spaced locations on their inner periphery for captive engagement by the spline members 32 as is old and well known in the art. Such discs 36 (pad 37) and 38 together with the disc 50 constitute the stators for brake 10.

Rotatable discs 62, 63, 64, 65 and 66 have a plurality of circumferentially spaced slotted openings along their outer periphery for engagement by the corresponding splines or ribs 30 as is old and well known in the art forming the rotors of the brake 10. All of the nonrotatable discs 37, 38 and 50 and rotatable discs 62 through 66 are made of a suitable brake material such as carbon composite friction material for withstanding high temperatures and providing a heat sink. The rotatable discs are interleaved between the nonrotatable disc. The number of discs may be varied based on the performance requirements of the particular application.

The actuating mechanism for the brake includes a plurality of circumferentially spaced cylinders 70 suitably connected to torque flange 25. Within each of the cylinders 70 is a hydraulic piston 72 located inside a sleeve 71 operative to move the nonrotatable disc 36 axially into and out of engagement with the rotatable disc 62. A retractor assembly or other mechanisms old and well known in the art may also be employed in cooperation with the cylinders 70 for automatic adjusting or wear compensation.

In the operation of the brake mechanism, pressurized hydraulic fluid from a suitable source is introduced to the cylinders 70 to move their respective pistons 72 toward nonrotatable disc 36. Disc 36 slides along the spline members 32 and into abutting engagement with rotatable disc 62. Rotatable disc 62 slides along spline 30 into engagement with nonrotatable disc 38, which also is forced axially into engagement with an adjacent rotatable disc which in turn moves into abutting engagement with other discs and under pressure one against the other and against the nonrotatable carbon composite disc 50 mounted on reaction plate 29 of torque tube 27. Drag generated by friction between each interleaved disc pair is reacted at the slots on the peripheries of rotating discs 62, 63, 64, 65, 66 and stationary discs 36, 37 and 38 and on the side edges of recesses 51 in end disc 50 to abutting side edges of bolt head 45 through the shank 46 into the bores 40 of the reaction plate 29 of torque tube 27. Such side edges of recesses 51 in the end disc 50 are the torque reaction points between the brake disc 50 and the backing plate 41.

In order to provide the necessary stiffness against the reactive forces on the torque tube 27, the end curved portion of tube 27 adjacent to the reaction plate 29 is sufficiently reinforced that it will not yield to the torque and actuation forces while providing a removable stationary braking pad thereon that may be utilized in the axially aligned interwoven stator and rotor brake discs to give maximum brake efficiency. Under normal conditions of brake use, the heat build up will cause an expansion of the parts in the heat sink. Since there is a space between the openings on the periphery of the stator and rotor discs relative to the splines, expansion is facilitated. In the case of the end carbon brake disc 50 relative to the backing plate 41 to which disc 50 is connected, there is a relative radial expansion of the plate 41 which does not affect carbon disc 50 at the torque reaction points along the recesses 51 since there is clearance space 51 radially outwardly of the bolt head 45 which is seated in the recess 51 of carbon composite disc 50. Such radial expansion reduces stress concentrations which are high due to the torque reaction loads. It is to be noted that the need for relief from stresses due to the thermal expansion between plate 41 and carbon composite disc 50 is not critical at the rivet connections therebetween since there is no torque reaction at this location but rather at the broad interfaces between the head of bolt 45 and the side surface of the recess 51. The material strengths at the rivet joints and on the rivets are sufficient to withstand the thermal expansion loads without causing damage or degradation. Under these conditions of operation, the heretofore cracks that emanated from torque buttons that had no radial clearance were eliminated. Such cracks in the brake pad would extend from the location of the torque recesses for the torque buttons in the carbon brake disc to the periphery of the discs. Such phenomena do not occur when structured as described above with the clearance space 52 being radially of the bolt head 45. Such construction of the carbon brake discs, including carbon brake disc 50, permits a greater utilization of the brake power between the stator and rotors to achieve maximum braking efficiency.

Considering the annular braking surfaces of such carbon disc 50, the side surfaces of the recess 51 bisects the mean brake radius of such disc. The mean brake radius in the circumferentially centerline of the braking surface of such disc 50, with half of the braking surface of such disc lying radially outwardly of such mean brake radius and half of the braking surface of such disc lying radially inwardly of such mean brake radius. This can be approximated by calculating the radius R-1 from the center of the disc 50 to the circle where the braking surface begins and then R-2 from the center of the disc 50 to the outer periphery of the disc 50, thence add R-1 plus R-2 and divide by 2. More accurately, such mean brake radius is calculated on the basis of equal area which is the outside diameter squared (disc 50) plus the inside diameter squared (braking surface of annular disc 50) divided by two and thence taking the square root of such figure which is further then divided by two.

It will be apparent that, although a specific embodiment of the invention has been described in detail, the invention is not limited to such specifically illustrated and described construction since variations may be made without departing from the principles of the invention.

We claim:

1. A wheel and brake assembly comprising fixed mounting means, a wheel member operatively connected to said fixed mounting means and rotatable with respect thereto, said wheel member having a plurality of axially extending splines, a torque tube member operatively connected to said fixed mounting means, said torque tube member having a radially outwardly extending annular end portion defining a torque plate, said torque tube having a plurality of axially extending splines, a plurality of primary friction discs carried by said splines on said wheel for rotation therewith, a plurality of secondary friction discs carried by said splines on said torque tube, said primary and secondary discs interleaved to form an axially moveable brake stack, an annular metal backing plate secured to said torque plate, an annular carbon composite friction brake disc mounted on said backing plate and secured thereto, force transmitting means operatively connected to said fixed mounting means for urging said brake stack against said carbon composite brake disc and causing frictional engagement between adjacent discs, means operatively interconnecting said annular carbon composite brake disc to said backing plate to allow radial relief from radial thermal stresses induced therebetween at said interconnecting means.

2. A wheel and brake assembly as set forth in claim 1 wherein said interconnecting means includes a plurality of circumferentially spaced torque reaction points located within the body of said annular carbon composite brake disc mounted on said backing plate which are operative to transmit torque loads to said torque tube on actuation of said force transmitting means for causing frictional engagement of adjacent discs.

3. A wheel and brake assembly as set forth in claim 2 wherein said torque reaction points are located along a line that is the mean brake radius with portions of each of said torque reaction points located above and below said mean brake radius.

4. A wheel and brake assembly as set forth in claim 1 wherein said interconnecting means includes a plurality of circumferentially spaced recesses in said carbon composite brake disc that is mounted on said backing plate which receives a member secured to said backing plate, and each of said recesses in said carbon composite brake disc has a clearance space radial of said member received therein from said baking member.

5. A wheel and brake assembly as set forth in claim 1 wherein said interconnecting means includes a plurality of circumferentially spaced contact surfaces between said carbon composite brake disc and said annular backing plate that are normal to the planar surface of said annular backing plate.

6. A wheel and brake assembly as set forth in claim 5 wherein said primary friction discs and said secondary friction discs have interfacing carbon disc pads, and said annular carbon brake disc is riveted onto said backing plate at circumferentially spaced locations.

7. A wheel and brake assembly as set forth in claim 1 wherein said interconnecting means includes bolt means which interconnects said backing plate to said torque plate, said annular carbon composite brake disc mounted on said backing plate having a plurality of circumferentially spaced recesses overlying said bolt means with a radial clearance space relative thereto providing for said relief from radial thermal induced stresses.

8. A wheel and brake assembly as set forth in claim 7 wherein all of said recesses are equidistant from the center of said carbon disc providing said clearance spaces in a radial direction relative to said bolts and their respective said recesses.

9. A wheel and brake assembly as set forth in claim 8 wherein said bolt means has a head portion with a pair of side edges, a lower edge, and an upper edge; said side edges abuttingly engage the sides of said recesses to provide reaction to friction generated torque on braking.

10. A wheel and brake assembly comprising fixed mounting means, a wheel member operatively connected to said fixed mounting means and rotatable with respect thereto, a torque tube member operatively connected to said fixed mounting means, said torque tube having a radially outwardly extending annular end portion defining a torque plate, an annular backing plate mounted on said torque plate, said annular backing plate having a pair of opposed surfaces, one of said surfaces abutting said torque plate, an annular end brake disc having a pair of flat planar surfaces, said annular end brake disc secured to said backing plate with one of said flat surfaces of said annular disc abutting the other one of said opposed surfaces of said backing plate, a plurality of primary friction brake discs carried by said wheel for rotation therewith, a plurality of secondary friction brake discs carried by said torque tube, said primary and secondary discs interleaved to form an axially moveable brake stack, force transmitting means operatively connected to said fixed mounting means for urging said brake stack against said end brake disc secured to said backing plate and causing frictional engagement between adjacent discs, said end brake discs having a plurality of circumferentially spaced recesses, said end brake disc secured to said backing plate by a plurality of circumferentially spaced rivets, bolt means interconnecting said backing plate to said torque plate, said bolt means having a head portion that extends into said recesses on said end brake disc, said head portions being smaller in dimension than said recesses in a radial direction as viewed in said end disc to provide a clearance space in a radial direction of said recesses to provide relief from radial thermal induced stresses between said backing plate and said end brake disc at said recesses, and said end brake disc and said backing plate made of materials having different rates of thermal expansion.

11. A wheel and brake assembly as set forth in claim 10 wherein each of said recesses have side surfaces that are radial in disposition on said end brake disc, and said side surfaces bisecting the mean brake radius of said end brake disc.

* * * * *